No. 885,733. PATENTED APR. 28, 1908.
A. DAY.
PACKAGING MACHINE.
APPLICATION FILED MAR. 27, 1905.
3 SHEETS—SHEET 2.
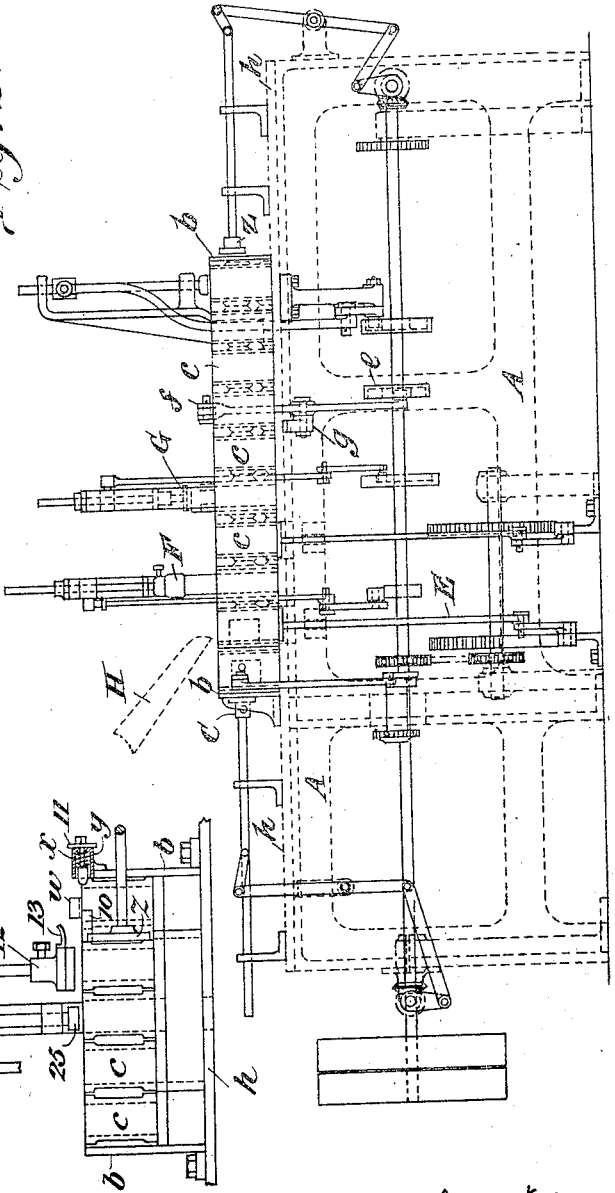
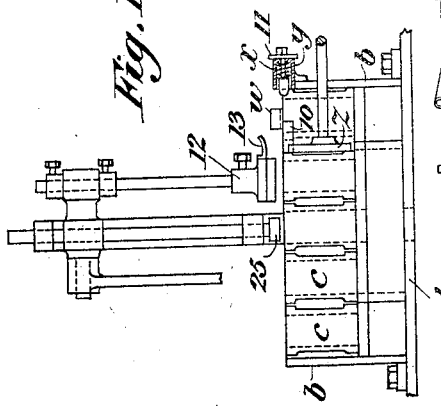

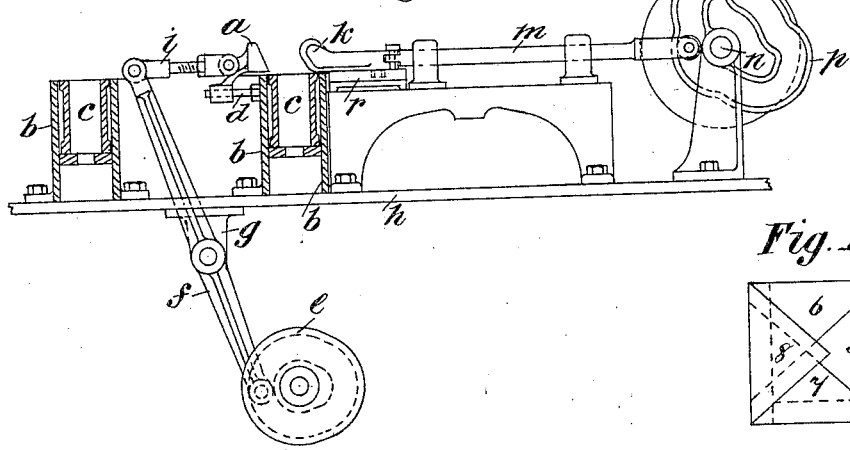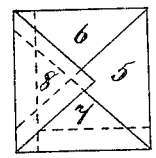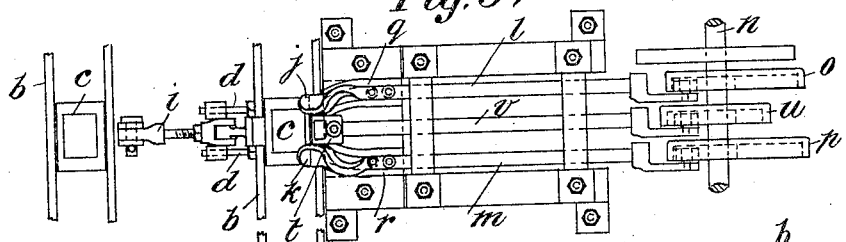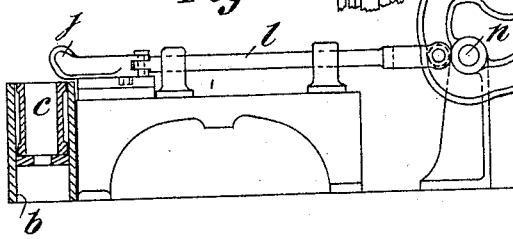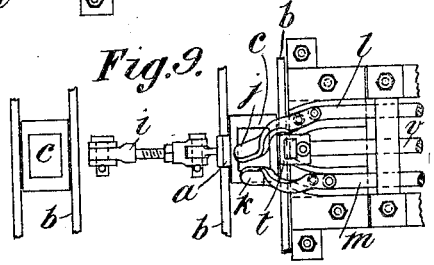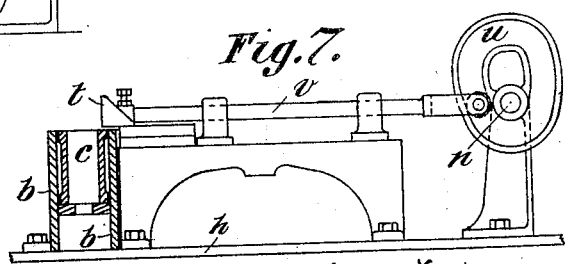

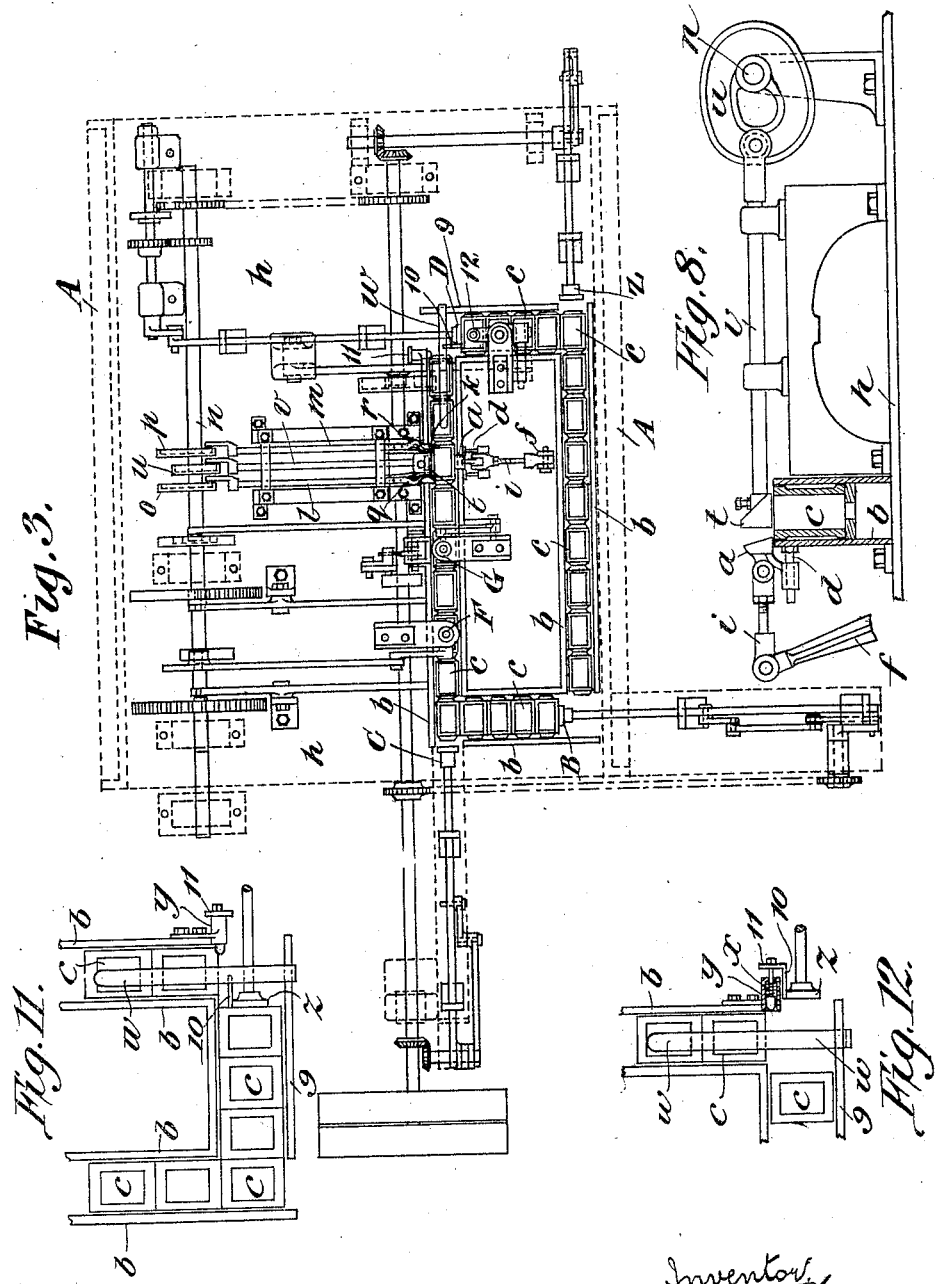

UNITED STATES PATENT OFFICE.

ALBERT DAY, OF LEEDS, ENGLAND.

PACKAGING-MACHINE.

No. 885,733.　　　Specification of Letters Patent.　　　Patented April 28, 1908.

Application filed March 27, 1905. Serial No. 252,325.

*To all whom it may concern:*

Be it known that I, ALBERT DAY, a subject of the King of Great Britain and Ireland, residing at 21 Hartley avenue, Leeds, in the county of York, England, have invented new and useful Improvements in Packaging-Machines, of which the following is a specification.

This invention relates to improvements in the machine described chiefly in the specification of United States of America Letters Patent granted to me on the seventeenth day of November 1903, No. 744,172. In the machine described in the said prior specification, a number of bottomless boxes traverse a rectangular track between guides, being moved intermittently by plungers at the corners of the track. Bags are placed in the boxes, and receive their contents from a chute, being shaken by a vibrating plunger beneath them. They are next rammed by a plunger and again shaken at the next station. A creasing-plate next descends on to the contents, and the front of the bag is folded down over it by a plate, the hinge pin of which can work in a vertical slot. The creasing-plate rises, and the bag moves to the next station, where the back flap is folded down by another hinged plate, and the front flap is folded down again by a horizontal slide, which passes between and opens the side flaps, and then these are folded down by two blades, which are guided by pins in curved cam slots. The box is adjusted at this station by a centering-fork. At another station the packet is pressed by a vertical plunger, and, finally, it is pushed through a hole in the bottom of the track by a plunger on to an endless band.

The objects of the present invention are first, to adapt the machine to produce the folds of what may be termed a "square" bag, such as is used for, say, tea, instead of the folds of the "rectangular" bag, such as is described in the said specification, and second, to provide means for more efficiently depositing and laying the cards in such "square" bag.

In the drawings hereunto annexed I have only shown such portions of the machine described and illustrated in the said specification as are necessary for applying this invention thereto.

Figure 1. is an end elevation of a "square" bag showing 1st end folds. Fig. 2. is a front elevation of the entire machine with the framework shown in dotted lines, and with this invention applied. Fig. 3. a plan of the same looking at the top and with the framework and table shown in dotted lines. Fig. 4. a part sectional elevation of the rectangular trough and of one of the side wipers in a withdrawn position. Fig. 5. a part plan of same. Fig. 6. a part sectional elevation of the rectangular trough and of the second wiper in a withdrawn position. Fig. 7. a part sectional elevation of the rectangular trough and of the side opener in a withdrawn position. Fig. 8. a part sectional elevation of the rectangular trough and of the side opener moved over the top of the said trough. Fig. 9. a part plan showing one of the side wipers moved inwards. Fig. 10. an end elevation of the rectangular trough and the stamper provided with means for retaining the traveling boxes in one portion of the said trough. Fig. 11. a plan of same. Fig. 12. a part plan showing the retaining means withdrawn so as to allow one of the traveling boxes to pass.

Like parts in all the views are marked with similar letters of reference.

In the present invention, that is, in what is termed the "square" bag,—the end of which is shown at Fig. 1,—the front portion 5 of the mouth of the bag is first folded, then the two sides 6, 7, are separately closed over the front portion, which causes the back portion 8 to assume a pointed or triangular form before being closed over.

The main features of this machine are of a similar construction to that described in the said prior specification, except as hereinafter mentioned.

A is the framework of the machine upon which is mounted the table *h*. The framework A and table *h* at Figs. 2 and 3 are shown in dotted lines. Upon the table *h* is mounted the rectangular track formed of guides *b* and hereafter termed "the guide trough *b*." In the said guide trough *b* a number of bottomless boxes *c* are intermittently reciprocated by plungers B, C, D, and Z at the corners of the track for first bringing the boxes *c* into line in one of the longitudinal sides of the rectangular track, and then for successively moving them for being shaken by a vibrating plunger E, next rammed by a plunger F, and again shaken at the next station. A creasing plate G next descends on to the contents, and the ends of the bag are operated upon and its folds formed as hereinafter described. Motion is communicated to the several above named operative parts by means of cams,—mounted upon shafts,—gearing and chains.

H is a chute through which the material is passed into the bag in one of the traveling boxes.

According to this invention the slotted plate provided with lugs and termed a "folder" which is described in the said prior specification as being mounted to the rear of the longitudinal portion of the rectangular guide trough b so as to work over the same in conjunction with the side folders, is dispensed with and in place thereof a block a is provided with its front face made to incline away from the top of the traveling box c working in the guide trough b, that is, the face is inclined from bottom to top, as shown at Figs. 4 and 8, while its sides are at or about a right angle with the guide trough b. The inclined faced block a is mounted by bosses upon rods d fixed to the side of the trough b. The said rods form bearings so that the said block is capable of receiving a short intermittent reciprocating motion from some rotating part of the machine by means of, say, a cam e mounted on the driving shaft of the machine, double ended lever f fulcrumed to a bracket g fixed to the underside of the table h, and an adjustable link i. The two side folders j, k, are jointed as hitherto to horizontal rods l, m,—mounted in suitable bearings,—capable of being separately intermittently reciprocated from some rotating part of the machine, say, the cam shaft n by means of two cams o, p, with or without the addition of adjustable links. In the drawings the adjustable links are shown dispensed with. The side folders j, k, are also moved inwards, that is, towards each other, by cam grooves or paths q, r, fixed to, say, the top of the table h of the machine. The cam paths are of a similar construction to those described in the hereinbefore mentioned specification. The side folders are provided with suitably shaped ends as shown, that is to say, they are curved and inclined as shown at Figs. 4 and 5, while their inner faces (Fig. 5) are at or about a right angle with the trough b, and their under surfaces are made flat. The movement of the said folders is so timed that at one portion of their action they are moved outwards and inwards simultaneously, as at Fig. 5, for, say, creasing purposes, and at another stage, say, for folding or closing the sides 6, 7, over separately and at different times, as at Fig. 9. But when the two folders j, k, are moved at different times it will be understood that when the folder k has been moved into a similar position to folder j, as shown at Fig. 9, the block a will also be moved inwards to produce a nipping action on fold 7 for preventing the said fold afterwards flying open. This difference in the movement is occasioned by the shaping and timing of the cams o, p, as shown at Figs. 4 and 6. One or both of the side folders may be provided with suitably shaped projections,—say, curved, as shown at Figs. 4, 5, and 9,—for causing the back upstanding portion 8 of the bag to be pressed into the space provided by the inclined face of the first named block a, for what is termed "opening the back" so as to insure the sides 6, 7, of the mouth being properly folded and creased, thereby reducing the liability of the back fold 8 being crumpled instead of accurately folded.

The horizontal plunger t described in the aforesaid prior specification as a "side opener" is still mounted on a horizontal rod v so as to slide in suitable bearings, fixed on the table h between the rods l, m, of the side folders j, k, and it is actuated by a separate cam u mounted upon the cam shaft n. The end of the said plunger t reciprocates over a traveling box c and it is now provided with an enlarged end having its front face and two of its sides at or about a right angle to the top of the traveling boxes c, as shown at Figs. 7 and 9, and it is against these last named two side faces that the side folds 6, 7, are creased and nipped, that is, when the blocks a and t are in the position shown at Fig. 8.

After the last named three folds,—front 5 and two sides 6, 7,—have been closed over, as above described and the back fold 8 made by the prior foldings to assume the triangular form shown at Fig. 1, the bag is made to travel forward in and with the box c by the plunger C under the bar w, which is employed for keeping the three previously folded portions 5, 6, 7, of the bag in their respective closed positions. At this stage of the folding and closing operations the back fold 8 is in an upstanding position and travels forwards with its box c on the inner longitudinal side or edge of the bar w (Figs. 11 and 12) until it reaches the end of the side of the rectangular trough b. The bar w is fixed to the end or transverse portion 9 of the rectangular guide trough b, so as to project a suitable distance from and over the boxes in its longitudinal portion. The back fold 8 is carried forwards in its upstanding position between the edge of the bar w and of the projection 13,—fixed to one of the sides or ends of the end stamper 12,—until the front portion of its carrying box c is in contact with the outer side of the transverse portion of the rectangular guide trough 9. The box c is then in a position to be acted upon by the plunger Z. As the plunger Z pushes the box c along the said transverse portion 9 towards the end stamper 12, the upstanding fold 8 is first moved away from the bar w and as it passes under the projection 13 the fold 8 is partially turned over the folds 5, 6, 7. When the partially folded end of the bag in the traveling box c has been traversed under the end stamper 12, the latter is caused to descend for finally pressing and closing fold 8 in position on to the bag. The box c with the completely folded bag therein is then ready to pass to the ejector 25, which takes place when another box c enters the transverse portion of the rectangular guide trough 9 and is acted upon by plunger z.

The traveling boxes c in this invention are retained in the main or longitudinal portion of the rectangular guide, through b by any suitable form of automatic checking device, such as for example, say, a spring pin x working in a tube or carrier y fixed to the end of the trough near to its transverse portion 9. The said spring pin x is provided with a large head adapted to be operated from some moving part of the machine, say, the plunger Z which causes the boxes c to travel in the transverse portion 9 of the said trough. Or the said spring pin may be operated directly by means of a rod, lever or levers, and a cam, not shown in the drawings, but arranged in a similar manner to the lever and cam shown at Fig. 4, or cam and rod shown at Figs. 6 and 8. When the plunger Z is withdrawn to the position shown at Fig. 12, the head of the spring pin x is withdrawn,—by means of the attachment 10 fixed to the plunger Z coming in contact with the plate 11 on the outer end of the spring pin,—within the tube or carrier y. A box c at the end of the side of trough b can then pass out of the longitudinal portion into its transverse portion 9. But when the plunger Z moves forward to traverse the boxes along the transverse portion 9 of the trough, as soon as the attachment 10 is clear of the piece 11 the spring pin x issues from its carrier y, as shown at Fig. 11, across the end of the longitudinal portion of the trough b, and thus prevents a box c therein being pressed forward into a position to be acted upon by plunger Z.

Other parts of the machine, and the various operations for folding and closing the mouth of the bag, may be similar to those described in the aforesaid specification.

The action of the machine is as follows:— An "open mouth" bag made by hand or machinery with one end folded and closed is placed in one of the boxes c (Figs. 10 and 11) which are intermittently made to travel in the trough b. The bag having been filled, shaken and stamped, it is then moved forward into position to be acted upon by the block q and folders j, k. The fold 5 is first closed over the top of the contents of the bag by the block t having been moved forward by cam u (Fig. 8), and while in this outward position the upstanding portions which form the folds 6, 7, (which are moved forward for the purpose) are nipped and creased by the vertical inner portions of the folders j, k, against the sides of the block t. The said block is then withdrawn. The folders j, k, are then moved forward respectively by the cams o, p, and they are separately moved across the top of the contents of the bag for closing the folds 6 and 7 thereon. When the folder k has been moved into a similar position in which folder j is shown at Fig. 9, the inclined block a is, by its cam e and lever f, moved inwards to produce a nipping action on fold 7 for preventing it afterwards flying open. The curved ends of the folders j, k, are also employed during their said movements for pressing the upstanding portion of fold 8 into the space between them and the inclined face of block a so as to insure of the sides 6, 7, of the mouth of the bag being properly folded and creased, thereby reducing the liability of the back fold 8 being crumpled when acted upon by the end stamper 12 instead of accurately folded. The fold 8 will by the previous described operations have assumed the triangular form and be in an upstanding position. The box c and the partially closed bag is then again made to travel forward with its back fold 8 still upstanding along the longitudinal side or edge of the bar w. The folded portions 5, 6, 7, of the bag simultaneously pass under the bar w (Fig. 11) which keeps the said three folds closed until the box has passed into the end portion 9 of the trough b and has been acted upon by the plunger Z for causing the box c to be brought under the end stamper 12. In order to prevent the boxes c passing too quickly into the said end portion the spring stop x is arranged to be operated by the plunger Z which is employed for intermittently operating the boxes c in the end portion of the trough. When the plunger Z is withdrawn to its outward position the spring stop x will by the attachment 10 coming in contact with the plate 11 cause the stop x to be withdrawn within the carrier y, and so allow a box c to pass from the longitudinal portion of the trough b into its end portion 9. The box is then traversed along the end portion 9 and as the upstanding fold 8 is passed under the end stamper 12 the said fold is closed on to the top of the contents of the bag by the projection 13, and the fold 8 is finally pressed and creased by the end stamper. As the plunger Z travels forward, carrying with it the attachment 10, the spring stop x is allowed to resume its normal position (Fig. 11) for preventing a box passing from the longitudinal portion of the trough b into its end portion 9. When another box c has been permitted to pass into the end portion 9 and is acted upon by the plunger Z the box with a completely folded bag will be made to pass under the ejector 25 for ejecting the bag from the box. The box is then made to travel around the remaining portions of the rectangular trough until it again reaches the points for inserting a bag into the box and filling it with material, and where the pressing and shaking takes place. The herein described operations are then repeated.

What I claim as my invention and desire to secure by Letters Patent is:—

1. In a packaging machine, the combination with a rectangular guide trough having boxes intermittently reciprocating therein and means for intermittently reciprocating the boxes, of guide rods fixed to one of the sides of the trough, a block with an inclined inner face adapted to slide on the guide rods, means for intermittently reciprocating said block over the trough, a second block with vertical face and sides arranged on the side of the said trough opposite to the inclined block, a rod upon which the last named block is mounted, and the means for intermittently reciprocating it across the top of the trough, substantially as herein set forth.

2. In a packaging machine, the combination with a rectangular guide trough having boxes intermittently reciprocating therein and means for intermittently reciprocating the boxes, of a block having an inclined face and working transversely over the said trough, guide rods fixed to the trough upon which said block slides, and means for intermittently reciprocating the block, a second block with vertical sides and face arranged to slide transversely over the trough from the side opposite to the first named block, a rod upon which the second block is mounted, means for intermittently reciprocating the same, a pair of side folders arranged one on each side of the second block, rods to which said side folders are jointed, and the means for intermittently separately actuating the rods and side folders, substantially as herein set forth.

3. The combination of a pair of side folders each having a curved and inclined end and vertical inner side, rods to which said side folders are jointed, means for separately intermittently reciprocating said folders, and cam paths fixed to the framework of the machine below the folders for causing the latter to close, and pins and runners fixed to side folders and working in said cam paths, substantially as herein set forth.

4. The combination of a pair of side folders each having a curved and inclined end and vertical inner side, rods to which said side folders are jointed, means for separately intermittently reciprocating said folders, and cam paths fixed to the framework of the machine below the folders for causing the latter to close, pins and runners fixed to side folders and working in said cam paths, a block with vertical sides and face mounted upon a rod between the two side folders and their rods, and the means for separately intermittently traversing the same, substantially as herein set forth.

5. The combination with a rectangular guide trough having boxes intermittently reciprocating therein and means for intermittently reciprocating the boxes, of a pair of side folders each having a curved and inclined end and vertical inner side, rods to which said side folders are jointed, means for separately intermittently reciprocating said folders, and cam paths fixed to the framework of the machine below the folders for causing the latter to close, pins and runners fixed to side folders and working in said cam paths, a block with vertical sides and face mounted upon a rod between the two side folders and their rods, the means for separately intermittently traversing the same across the top of said trough, a block with an inclined face arranged on the opposite side of the trough to the side folders, guide rods fixed to side of the trough upon which the inclined block slides, and the means for intermittently and separately causing it to traverse across the top of the trough substantially as herein set forth.

6. In a packaging machine the combination with a rectangular guide trough having boxes intermittently reciprocating therein and means for intermittently reciprocating the boxes, of a bar fixed to the end of said trough and projecting longitudinally over the top of one of the sides of the trough, as and for the purposes set forth.

7. In a packaging machine, the combination with a rectangular guide trough having boxes intermittently reciprocating therein and means for intermittently reciprocating the boxes, of the means for retaining the boxes in the longitudinal side of the trough, said means consisting of a carrier fixed to the side of the trough, a spring stop mounted within said carrier, a plate fixed to the outer end of said stop, and the means for intermittently operating the stop, as and for the purposes set forth.

8. The combination of a rectangular guide trough, boxes intermittently reciprocating in said trough and having paper bags therein, means for intermittently reciprocating the said boxes, a bar fixed to the end of said trough and projecting longitudinally over the tops of the boxes in the trough, a vertically reciprocating end stamper working over the end of the trough, and a projection fixed to the end stamper for closing the last fold on to the top of the bag, substantially as herein set forth.

9. The combination of a rectangular guide trough, boxes intermittently reciprocating in said trough and having paper bags therein, means for intermittently reciprocating the said boxes, a bar fixed to the end of said trough and projecting longitudinally over the tops of the boxes in the trough, a vertically reciprocating end stamper working over the end of the trough, a projection fixed to the end stamper for closing the last fold on to the top of the bag, a carrier fixed to the side of the trough, a spring stop mounted within said carrier, a plate fixed to the outer end of said stop, an intermittently reciprocating plunger working in the end of said trough, and an attachment fixed to said plunger for intermittently actuating the said stop, as and for the purposes set forth.

10. In a packaging machine, the combination of a rectangular trough mounted upon the table of the machine, boxes intermittently reciprocating in said trough and having a bag placed in each box, means for intermittently reciprocating the said boxes, a pair of side folders each having a curved and inclined end and vertical inner side, rods to which said side folders are jointed, means for separately intermittently reciprocating said folders, and cam paths fixed to the framework of the machine below the folders for causing the latter to close, pins and runners fixed to side folders and working in said cam paths, a rod working between the two side folders, a block with vertical sides and face mounted upon said rod, the means for separately intermittently traversing the same across the top of said trough, a block with an inclined face arranged on the opposite side of the trough to the side folders, guide rods fixed to side of the trough upon which the inclined block slides, and the means for intermittently and separately causing it to traverse across the top of the trough, a bar fixed to the end of said trough and projecting longitudinally over the tops of the boxes in the trough, a vertically reciprocating end stamper working over the end of the trough, a projection fixed to the end stamper for closing the last fold on to the top of the bag, an intermittently reciprocating plunger working in the end of said trough, and an attachment fixed to said plunger for intermittently actuating the said stop, as and for the purposes set forth.

In testimony whereof I have signed my name to this specification in the presence of two subscribing witnesses.

ALBERT DAY.

Witnesses:
WILLIAM SADLER,
ANNIE PARK.